(12) United States Patent
Liu et al.

(10) Patent No.: US 8,176,203 B1
(45) Date of Patent: May 8, 2012

(54) LOAD BALANCING USING IPV6 MOBILITY FEATURES

(75) Inventors: Zaide Liu, Cupertino, CA (US);
Richard David Day, Upton, MA (US);
Eric Sven-Johan Swildens, Mountain View, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 13/275,115

(22) Filed: Oct. 17, 2011

Related U.S. Application Data

(63) Continuation of application No. 12/635,610, filed on Dec. 10, 2009, now Pat. No. 8,078,755, which is a continuation of application No. 11/143,872, filed on Jun. 1, 2005, now Pat. No. 7,650,427.

(60) Provisional application No. 60/627,798, filed on Oct. 29, 2004.

(51) Int. Cl.
*G06F 15/173* (2006.01)

(52) U.S. Cl. ........ 709/238; 709/203; 709/217; 709/227; 709/235; 709/246; 370/237; 370/351; 370/392; 370/395.32; 455/436

(58) Field of Classification Search .................. 709/203, 709/217, 227, 235, 241, 244, 246
See application file for complete search history.

(56) References Cited

U.S. PATENT DOCUMENTS

| | | |
|---|---|---|
| 5,774,660 A | 6/1998 | Brendel et al. |
| 6,003,030 A | 12/1999 | Kenner et al. |
| 6,006,264 A | 12/1999 | Colby et al. |
| 6,029,175 A | 2/2000 | Chow et al. |
| 6,078,943 A | 6/2000 | Yu |
| 6,182,139 B1 | 1/2001 | Brendel |
| 6,185,586 B1 | 2/2001 | Judson |
| 6,226,684 B1 | 5/2001 | Sung et al. |
| 6,343,326 B2 | 1/2002 | Acharya et al. |
| 6,490,624 B1 | 12/2002 | Sampson et al. |
| 6,502,125 B1 | 12/2002 | Kenner et al. |
| 6,513,061 B1 | 1/2003 | Ebata et al. |
| 6,578,085 B1 | 6/2003 | Khalil et al. |
| 6,601,101 B1 | 7/2003 | Lee et al. |
| 6,628,617 B1 | 9/2003 | Karol et al. |
| 6,633,560 B1 | 10/2003 | Albert et al. |

(Continued)

OTHER PUBLICATIONS

D Johnson et al.; Mobility Support in IPv6; Jun. 2004; http://www.ietf.org/rfc/rfc3775.txt, 143 pages.

(Continued)

*Primary Examiner* — Michael Won
(74) *Attorney, Agent, or Firm* — Joshua T. Matt

(57) ABSTRACT

Techniques are provided for using the mobility support features of IPv6 to allow client and server nodes to communicate without the continuing intervention of a load-balancing node that selected the server node. A load-balancing node intercepts a TCP SYN packet addressed to a virtual IP address. The load-balancing node selects a server node from among multiple server nodes, and sends the packet toward the server node. The server node sends an IPv6 packet toward the client node. The packet contains a Binding Update option that specifies the virtual IP address as a Home Address. This information causes the client node to replace destination addresses in outgoing IP packets so that packets that the client node would have sent toward the virtual IP address are sent toward the selected server node's IP address instead. Consequently, the IP packets are routed toward the selected server node instead of the load-balancing node.

22 Claims, 6 Drawing Sheets

U.S. PATENT DOCUMENTS

| | | | |
|---|---|---|---|
| 6,650,621 B1 | 11/2003 | Maki-Kullas | |
| 6,650,641 B1 | 11/2003 | Albert et al. | |
| 6,671,259 B1 | 12/2003 | He et al. | |
| 6,691,227 B1 | 2/2004 | Neves et al. | |
| 6,779,017 B1 | 8/2004 | Lamberton et al. | |
| 6,804,720 B1 * | 10/2004 | Vilander et al. | 709/229 |
| 6,856,991 B1 | 2/2005 | Srivastava | |
| 6,920,498 B1 | 7/2005 | Gourlay et al. | |
| 6,970,913 B1 | 11/2005 | Albert et al. | |
| 7,007,103 B2 | 2/2006 | Pinkerton et al. | |
| 7,020,698 B2 | 3/2006 | Andrews et al. | |
| 7,058,706 B1 | 6/2006 | Iyer et al. | |
| 7,065,584 B1 | 6/2006 | Shavitt et al. | |
| 7,080,151 B1 | 7/2006 | Borella et al. | |
| 7,088,718 B1 | 8/2006 | Srivastava | |
| 7,096,263 B2 | 8/2006 | Leighton et al. | |
| 7,111,061 B2 | 9/2006 | Leighton et al. | |
| 7,143,184 B1 | 11/2006 | Shah et al. | |
| 7,162,529 B2 | 1/2007 | Morishige et al. | |
| 7,191,226 B2 * | 3/2007 | Flykt et al. | 709/218 |
| 7,194,002 B2 | 3/2007 | Zhang et al. | |
| 7,251,688 B2 | 7/2007 | Leighton et al. | |
| 7,274,658 B2 | 9/2007 | Bornstein et al. | |
| 7,293,093 B2 | 11/2007 | Leighton et al. | |
| 7,305,429 B2 | 12/2007 | Borella | |
| 7,313,631 B1 * | 12/2007 | Sesmun et al. | 709/245 |
| 7,328,281 B2 * | 2/2008 | Takeda et al. | 709/246 |
| 7,388,850 B2 | 6/2008 | Ochi et al. | |
| 7,519,738 B2 * | 4/2009 | Forsberg | 709/245 |
| 7,535,907 B2 | 5/2009 | Hussain et al. | |
| 7,539,773 B2 * | 5/2009 | Akisada et al. | 709/245 |
| 7,552,234 B2 * | 6/2009 | Thubert et al. | 709/238 |
| 7,617,274 B2 | 11/2009 | Coughlin et al. | |
| 7,639,686 B2 * | 12/2009 | Wetterwald et al. | 370/392 |
| 7,650,427 B1 * | 1/2010 | Liu et al. | 709/238 |
| 7,657,629 B1 | 2/2010 | Kommula | |
| 7,693,959 B2 | 4/2010 | Leighton et al. | |
| 7,698,458 B1 | 4/2010 | Liu et al. | |
| 7,711,819 B2 * | 5/2010 | Ono et al. | 709/226 |
| 7,746,873 B2 * | 6/2010 | Saito et al. | 370/400 |
| 7,756,061 B2 * | 7/2010 | Matsumoto | 370/254 |
| 7,764,949 B2 * | 7/2010 | Suh et al. | 455/411 |
| 7,805,517 B2 | 9/2010 | Shim et al. | |
| 7,995,523 B2 * | 8/2011 | Chen | 370/329 |
| 8,014,344 B2 * | 9/2011 | Mahkonen | 370/328 |
| 8,046,452 B2 * | 10/2011 | Hovell et al. | 709/224 |
| 8,078,753 B2 * | 12/2011 | Bachmann et al. | 709/238 |
| 8,078,755 B1 | 12/2011 | Liu et al. | |
| 2002/0048269 A1 | 4/2002 | Hong et al. | |
| 2003/0056002 A1 | 3/2003 | Trethewey | |
| 2003/0191970 A1 | 10/2003 | Devine et al. | |
| 2003/0225900 A1 | 12/2003 | Morishige et al. | |
| 2004/0063402 A1 | 4/2004 | Takeda et al. | |
| 2004/0103194 A1 | 5/2004 | Islam et al. | |
| 2004/0107234 A1 | 6/2004 | Rajahalme | |
| 2004/0148364 A1 * | 7/2004 | Kim et al. | 709/217 |
| 2004/0233916 A1 | 11/2004 | Takeuchi et al. | |
| 2004/0236937 A1 | 11/2004 | Perkins et al. | |
| 2004/0260745 A1 | 12/2004 | Gage et al. | |
| 2005/0091379 A1 * | 4/2005 | Kim et al. | 709/227 |
| 2005/0097185 A1 | 5/2005 | Gibson et al. | |
| 2005/0114515 A1 | 5/2005 | Droms | |
| 2005/0172011 A1 | 8/2005 | Gourlay et al. | |
| 2005/0208947 A1 | 9/2005 | Bahl | |

OTHER PUBLICATIONS

U.S. Appl. No. 12/491,798 (Available in IFW).
US. Appl. No. 11/143,101 (Available in IFW).
Final and Non-Final Office Actions from USPTO mailed during prosecution of U.S. Appl. No. 11/143,101 (Available in IFW), dated Aug. 5, 2010, Nov. 6, 2010, Mar. 26, 2009, Sep. 30, 2009, Mar. 25, 2010, Sep. 9, 2010, and May 31, 2011.

* cited by examiner

LOAD BALANCING USING IPV6 MOBILITY FEATURES

CROSS-REFERENCE TO RELATED APPLICATIONS; PRIORITY CLAIM

This application is a continuation of U.S. patent application Ser. No. 12/635,610, filed Dec. 10, 2009, and titled "LOAD BALANCING USING IPV6 MOBILITY FEATURES", which is a continuation of U.S. patent application Ser. No. 11/143,872, filed Jun. 1, 2005, and titled "LOAD BALANCING USING IPV6 MOBILITY FEATURES" (now U.S. Pat. No. 7,650,427), which claims the benefit of priority under 35 U.S.C. §119(e) to U.S. Provisional Patent Application Ser. No. 60/627,798, filed Oct. 29, 2004. The entire contents of all of the above-referenced applications are hereby incorporated by reference as if fully set forth herein.

FIELD OF THE INVENTION

The present invention relates to using the mobility support features of Internet Protocol version 6 (IPv6) to allow a client and a server to communicate without the continuing intervention of a load-balancing mechanism that selected the server.

BACKGROUND

It is commonplace nowadays for a Web browser ("client") to access content that is stored on a remote server by sending a request to the remote server using the remote server's Universal Resource Locator (URL) and receiving the content in response. Web sites associated with very popular URLs receive an extremely large volume of such requests from separate clients. In order to handle such a large volume of requests, these Web sites sometimes make use of a proxy device that initially receives requests and distributes them, according to some scheme, among multiple servers.

One such scheme attempts to distribute requests relatively evenly among servers that are connected to the proxy device. A proxy device employing this scheme is commonly called a "load balancer." When successful, a load balancer helps to ensure that no single server in a server "farm" becomes inundated with requests.

When a proxy device receives a request from a client, the proxy device determines to which server, of many servers, the request should be directed. For example, a request might be associated with a session that is associated with a particular server. In that case, the proxy device might need to send the request to the particular server with which the session is associated.

A proxy device typically communicates with servers using a suite of protocols. For example, the proxy device may use the Internet Protocol (IP), Transport Control Protocol (TCP), and Hypertext Transfer Protocol (HTTP) in combination to communicate with a server. Some of these protocols are connection-oriented. Connection-oriented protocols typically require the negotiation of connection-related parameters between the nodes that are to be involved in the connection before the connection is "opened." Data can be sent through the connection only after these parameters have been negotiated and the connection has been opened.

Parameter negotiation is often achieved through a "handshake" phase of a protocol. A handshake phase usually requires a significant amount of communication between the nodes. When encryption is involved, a handshake phase also may require a significant amount of processing by the nodes.

After a connection has been opened between the proxy device and a particular server, the proxy device receives a request from a client and forwards that request to the particular server through the connection. The particular server sends a response to the proxy device through the connection. The proxy device forwards the response to the client. Several requests and responses might be sent through the connection during the course of a transaction between the client and the particular server.

The proxy device acts as an intermediary throughout the communications between the client and the server. Data packets sent from the client pass through the proxy device on the way to the server. Data packets sent from the server pass through the proxy device on the way to the client. This can produce a communications "bottleneck" at the proxy device. When a single proxy device acts as an intermediary for many clients and servers, communications between those clients and servers may be delayed significantly.

Furthermore, when all communications that transpire between a client and server must pass through a proxy device, the client and the server become absolutely dependent upon the proxy device. If the proxy device fails for any reason, then the connection path between the client and the server is severed. The client and the server might not be able to resume communications at all until the proxy device becomes operational again. Even after the proxy device becomes operational again, client-to-proxy device and proxy device-to-server connections will need to be re-established via another round of time-consuming handshake phases.

In addition to causing communications between a client and a server to be interrupted, the failure of a proxy device can result in the loss of session state information that pertains to client-server sessions. Under some current approaches, session state information is stored at a proxy device rather than a server, so that if the server fails, then the proxy device can seamlessly continue the session with another server. However, viewed from one perspective, this approach merely pushes vulnerabilities from the server to the proxy device. If the proxy device suffers data loss, then all sessions that were being maintained by the proxy device may be irreparably lost also.

Some approaches attempt to compensate for this vulnerability by providing a "backup" proxy device, to which the "primary" proxy device periodically transmits updated session state information. If the "primary" proxy device fails, then the "backup" proxy device can be made, quickly, to function as a substitute for the "primary" proxy device. Unfortunately, if the "primary" proxy device fails soon before transmitting updated session state information to the "backup" proxy device, then the session state information that the "backup" proxy device will use to resume the client-server sessions may be stale, outdated, and inaccurate. The transmission of updated session state information between "primary" and "backup" proxy devices also may consume a substantial amount of network bandwidth.

Consequently, a technique that enables load-balanced communications between clients and servers, and which does not suffer from the disadvantages of some of the approaches discussed above, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
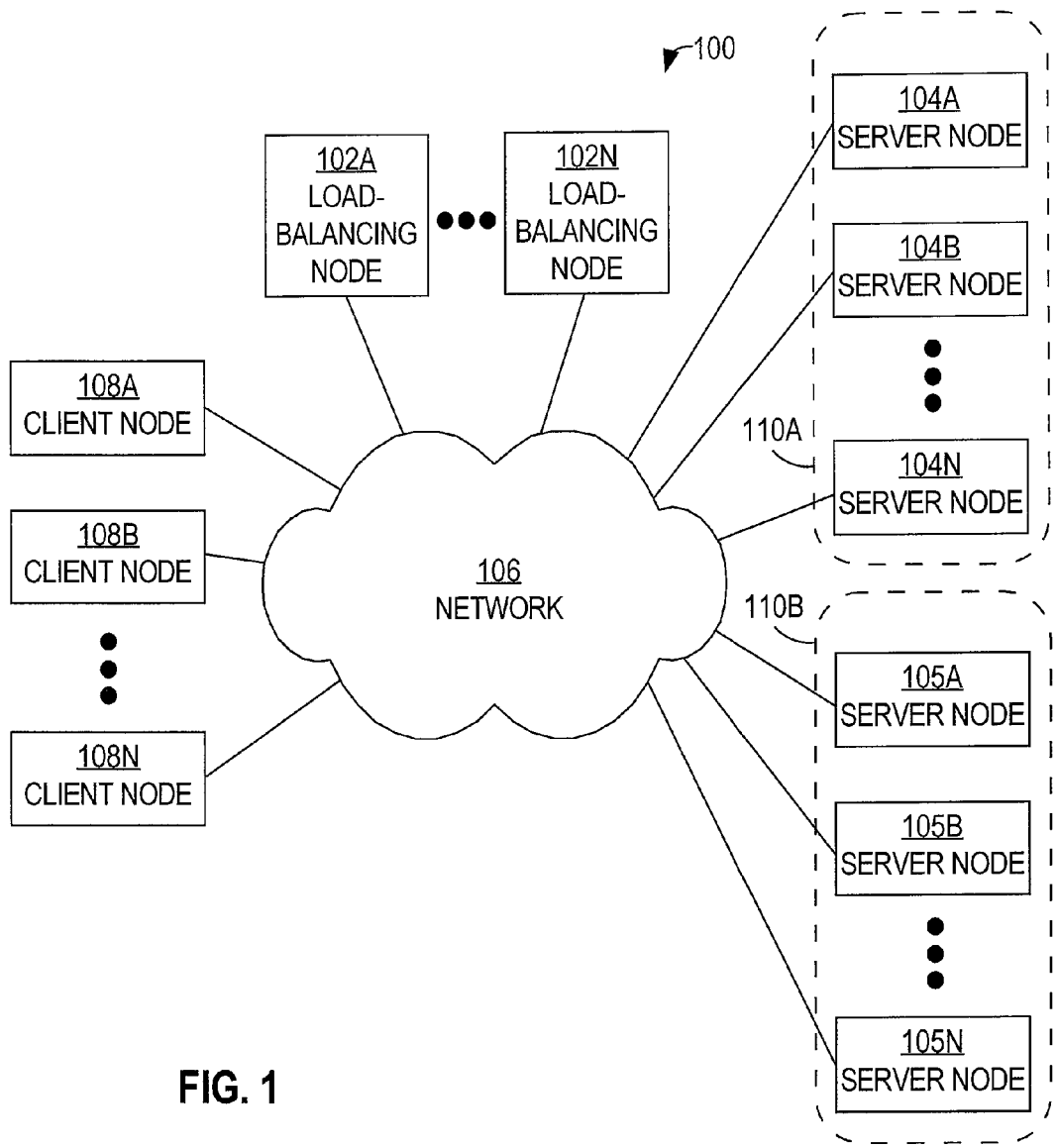
FIG. 1 is a block diagram that illustrates a system in which techniques for enabling more direct client-server communication may be practiced.

In the following description, for the purposes of explanation, numerous specific details are set forth in order to provide a thorough understanding of the embodiments of invention described herein. It will be apparent, however, that embodiments of the invention may be practiced without these specific details. In other instances, well-known structures and devices are shown in block diagram form in order to avoid unnecessarily obscuring the description of embodiments of the invention.

Functional Overview

Techniques are discussed herein for using the mobility support features of IPv6 to allow a client node and a server node to communicate without the continuing intervention of a load-balancing node that selected the server node. According to some of these techniques, a virtual IP address is associated with an entire server "farm" or "cluster." A client node sends an IP packet toward the virtual IP address. Typically, one or more routing nodes lie between the client node and the server cluster. A load-balancing node advertises, to the routing nodes, that the virtual IP address is reachable through the load-balancing node. As a result, the routing nodes eventually route, to the load-balancing node, IP packets that are addressed to the virtual IP address. The load-balancing node intercepts such IP packets. An intercepted IP packet may contain a TCP packet that signals the recipient to engage in a handshake phase with the client node. TCP is described in the Internet Engineering Task Force (IETF) Request For Comments (RFC) 793, which is incorporated by reference in its entirety for all purposes as though fully disclosed herein.

However, according to one technique, rather than engaging in a handshake phase with a client node that sent such an intercepted packet, the load-balancing node selects a server node from among multiple server nodes that exist in a server cluster that is associated with the virtual IP address, and sends the intercepted packet toward the selected server node. In response to receiving the TCP packet, the selected server node completes a handshake phase with the client node, thereby establishing a connection path between the client node and the server node. The connection path does not need to include the load-balancing node.

During the course of the handshake phase, the server node sends an IPv6 packet toward the client node. The IPv6 packet contains an IPv6 Mobility Header. The Mobility Header contains a Binding Update option. The Binding Update option specifies a Home Address option that indicates the virtual IP address. As a source IP address, the IPv6 packet indicates the "physical," or "care-of" IP address of the selected server—which differs from the virtual IP address. IPv6 mobility features are described in the IETF RFC 3775, which is incorporated by reference in its entirety for all purposes as though fully disclosed herein.

The client node receives the IPv6 packet. The information in the Mobility Header causes the client node to perform IP address replacement operations so that IP packets that the client node otherwise would have addressed to the virtual IP address are addressed to the physical IP address of the selected server node instead. Consequently, the IP packets are routed toward the selected server node instead of the load-balancing node. Thereafter, IP packets that the selected server sends toward the client node contain an IPv6 Mobility Header such as the one described above, which causes the client node to continue to perform such IP address replacement operations. As a result, the client node and the server node may communicate without the continuing intervention of the load-balancing node that selected the server node.

Variations of, alternatives to, and enhancements to the foregoing technique are described in greater detail below.

Architectural Overview

FIG. 1 is a block diagram that illustrates a system 100 in which techniques for enabling more direct client-server communication may be practiced. According to one embodiment, system 100 comprises load-balancing nodes 102A-N, server clusters 110A and 110B, network 106, and client nodes 108A-N. Server cluster 110A comprises server nodes 104A-N. Server cluster 110B comprises server nodes 105A-N.

Each of server nodes 104A-N and 105A-N is coupled communicatively with network 106. Each of server nodes 104A-N and 105A-N may be a separate computer. Alternatively, each of server nodes 104A-N and 105A-N may be a separate process executing on the same or on separate computers. For example, each of server nodes 104A-N and 105A-N may include a separate HTTP server (or "Web server") process. Server nodes 104A-N and 105A-N receive requests and send responses through network 106. Such requests and responses may be, for example, HTTP requests and responses carried over TCP and IP. Each of server nodes 104A-N and 105A-N is associated with a different IP address.

Each of load-balancing nodes 102A-N is also coupled communicatively with network 106. Load-balancing nodes 102A-N also receive requests through network 106. In response to receiving IP packets, load-balancing nodes 102A-N select server nodes and send the IP packets toward the selected server nodes. Load-balancing nodes 102A-N may be implemented within separate network routing devices, for example. Each of load-balancing nodes 102A-N is associated with a different IP address.

Network 106 is a computer network, such as, for example, a local area network (LAN), wide area network (WAN), or internetwork such as the Internet. Network 106 may comprise multiple interconnected routing nodes, such as network routers, which use routing protocols and routing tables to forward IP packets toward destination IP addresses that are specified within those IP packets.

Client nodes 108A-N also are coupled communicatively with network 106. Each of client nodes 108A-N may be a separate computer. Alternatively, each of client nodes 108A-N may be a separate process executing on the same or on separate computers. For example, each of client nodes 108A-N may include a separate HTTP client (or "Web browser") process. Each of client nodes 108A-N is associated with a different IP address.

Each of server clusters 110A and 110B is associated with a separate virtual IP address; the virtual IP addresses are not associated with any individual physical machine or computer. Client nodes 108A-N initially send requests through network 106 toward such virtual IP addresses. Due to advertising by load-balancing nodes 102A-N, these requests are routed to and intercepted by load-balancing nodes 102A-N. Load-balancing nodes 102A-N send intercepted requests to various ones of server nodes 104A-N and 105A-N. Server nodes 104A-N and 105A-N send responses to the requests that they receive. However, instead of sending responses to load-balancing nodes 102A-N, server nodes 104A-N and 105A-N may send responses toward client nodes 108A-N via routes that do not include load-balancing nodes 102A-N, using a technique that is described in greater detail below.

In one embodiment, one or more entities (e.g., individuals, corporations, partnerships, etc.) each pay a fee to the service provider of server nodes 104A-N and/or 105A-N in order to have content (e.g., files, Web pages, etc.) hosted on server nodes 104A-N and/or 105A-N. In one embodiment, one or more entities each pay a fee to such a service provider in order to have server nodes 104A-N and/or 105A-N provide specified services for the one or more entities.

Load Balancing with Undelayed Binding

Figure 2:
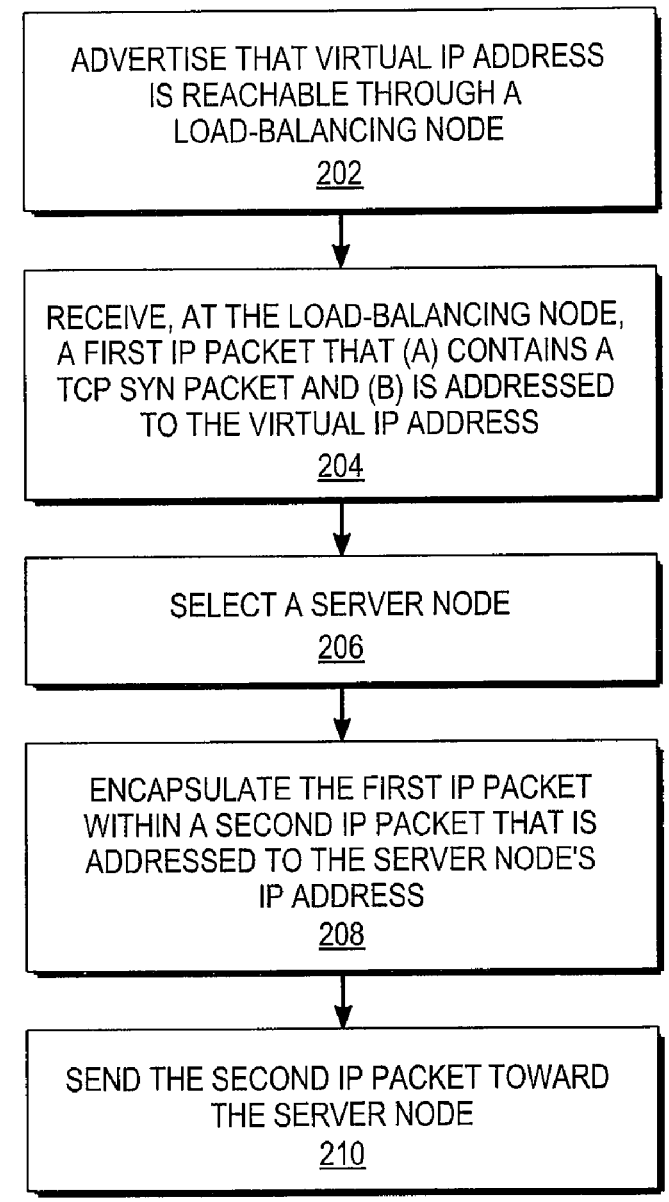
FIG. 2 is a flowchart that illustrates a technique by which a load-balancing node enables a client node and a server node to communicate without further intervention from the load-balancing node after the load-balancing node has selected the server node, according to one embodiment of the invention.

FIG. 2 is a flowchart that illustrates a technique by which a load-balancing node enables a client node and a server node to communicate without further intervention from the load-balancing node after the load-balancing node has selected the server node, according to one embodiment of the invention. In order to better describe the technique, examples given below refer to entities shown within FIG. 1. For example, the technique may be performed by any of load-balancing nodes 102A-N.

Referring to FIG. 2, in block 202, a load-balancing node advertises, to one or more routing nodes, that a particular virtual IP address is reachable through the load-balancing node. For example, using a routing protocol, load-balancing node 102A may advertise, to one or more network routers within network 106, that a particular virtual IP address, which is associated with server cluster 110A, is reachable through load-balancing node 102A. As a result, the network routers may send, toward load-balancing node 102A, IP packets that indicate the particular virtual IP address as a destination IP address.

In block 204, a first IP packet is received at the load-balancing node. The first IP packet contains a TCP SYN packet. The first IP packet also indicates the particular virtual IP address as a destination IP address. For example, load-balancing node 102A may receive an IP packet that client node 108A addressed to the particular virtual IP address that is associated with server cluster 110A.

In block 206, a server node is selected from among a plurality of server nodes. For example, load-balancing node 102A may select server node 104A from among server nodes 104A-N. The selection may be based on the contents of the first IP packet as well as other criteria, some of which are described in greater detail below. Inasmuch as each server node is associated with its own distinct IP address, the selected server node is associated with an IP address that differs from the virtual IP address.

In block 208, the first IP packet is encapsulated within a second IP packet. While the first IP packet indicates the virtual IP address as a destination IP address, the second IP packet indicates the selected server node's IP address as a destination IP address. As a result, routing nodes that receive the second IP packet will forward the second IP packet toward the selected server. For example, load-balancing node 102A may encapsulate the first IP packet within a second IP packet, as described above, using IPv6 encapsulation mechanisms.

In block 210, the second IP packet is sent toward the selected server node. For example, load-balancing node 102A may send the second IP packet through network 106 toward server node 104A. Because load-balancing node 102A forwards the TCP SYN packet toward server node 104A instead of responding to the TCP SYN packet with a TCP SYN/ACK packet, client node 108A and server node 104A may engage in a TCP handshake phase to establish a TCP connection that does not need to involve load-balancing node 102A. Thus, according to this particular technique, load-balancing node 102A does not "delay" the binding between client node 108A and server node 104A.

Once the selected server node receives the second IP packet, which contains the first IP packet, which contains the TCP SYN packet, the selected server node may perform a technique that enables the client node and the selected server node to communicate without the intervention of the load-balancing node. Such a technique is described below with reference to FIG. 3.

Figure 3:
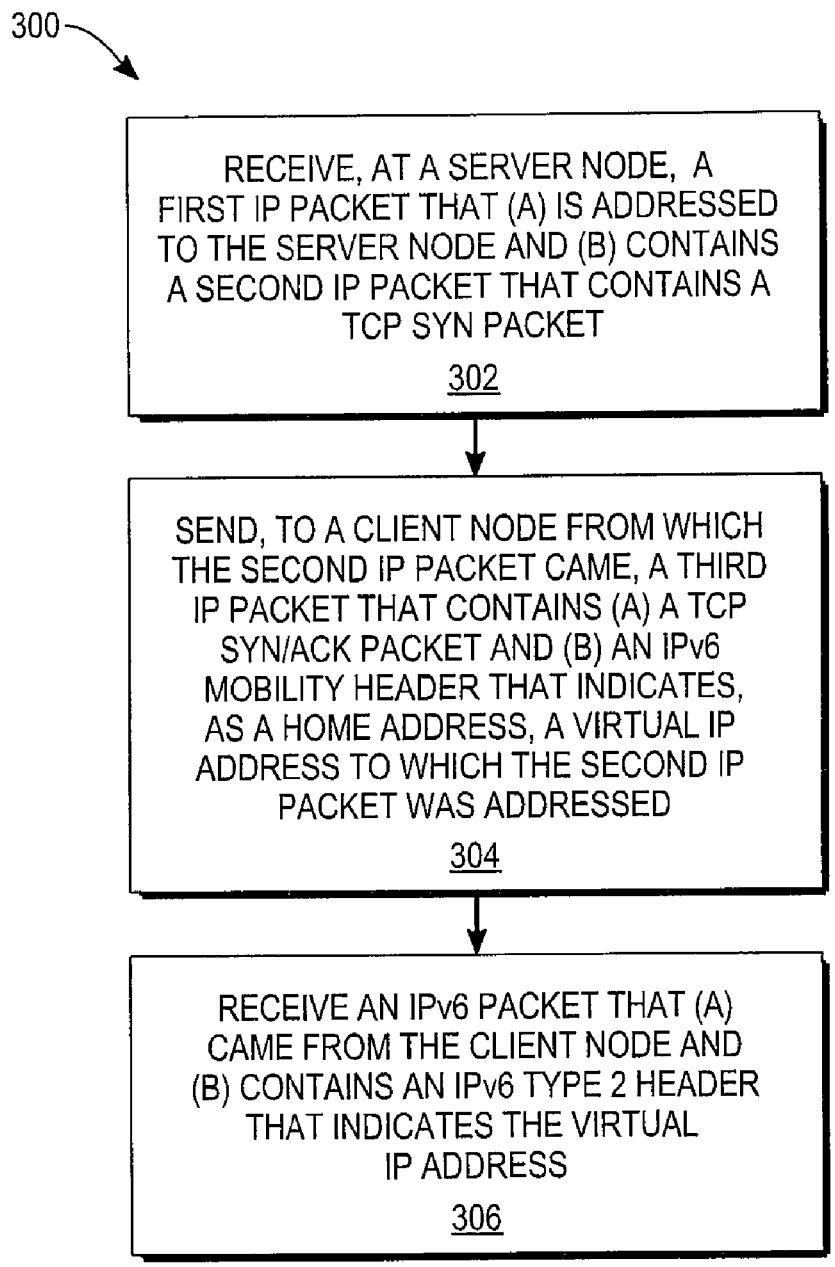
FIG. 3 is a flowchart that illustrates a technique by which a server node that was selected by a load-balancing node engages in a handshake phase with a client node that sent a connection request toward the load-balancing node, according to one embodiment of the invention.

FIG. 3 is a flowchart that illustrates a technique by which a server node that was selected by a load-balancing node engages in a handshake phase with a client node that sent a connection request toward the load-balancing node, according to one embodiment of the invention. In order to better describe the technique, examples given below refer to entities shown within FIG. 1. For example, the technique may be performed by any of server nodes 104A-N or 105A-N.

Referring to FIG. 3, in block 302, a first IP packet is received at a server node. The first IP packet indicates the server node's IP address as a destination IP address. The first IP packet contains a second IP packet. For example, server node 104A may receive a particular IP packet that load-balancing node 102A sent toward server node 104A. The particular IP packet may contain another IP packet that load-balancing node 102A intercepted and encapsulated within the particular IP packet, as described above.

The second IP packet indicates, as a source IP address, an IP address of a client node from which the second IP packet originated. The second IP packet also indicates, as a destination IP address, a virtual IP address that is associated with a server cluster to which the server node belongs. A selected server node has the virtual IP address on an interface (possibly on a loopback or physical) so it can receive the IP packets destined for the virtual IP address. The second IP packet contains a TCP SYN packet, which signals the server node to engage in a handshake phase with the TCP SYN packet's sender.

For example, the source IP address of the second IP packet may be an IP address that is associated with client node 108A, which originally sent the second IP packet toward the virtual IP address. The destination IP address of the second IP packet may be the virtual IP address that is associated with server cluster 110A.

In block 304, in response to receiving the TCP SYN packet, a third IP packet is sent toward the client node that is associated with the second packet's indicated source IP address. The third IP packet contains a TCP SYN/ACK packet that indicates, to the client node, which of the TCP parameters proposed in the TCP SYN packet the server node has accepted for use in the forthcoming TCP connection between the client node and the server node. For example, server node 104A may send, toward client node 108A, an IP packet that contains such a TCP SYN/ACK packet. Server node 104A does not need to send this IP packet via load-balancing node 102A. Thus, server node 104A engages in a handshake phase with client node 108A, without the continuing intervention of load-balancing node 102A.

The third IP packet also contains an IPv6 Mobility Header, such as is described in the IETF RFC 3775. The Mobility Header contains a Binding Update option. The Binding Update option specifies a Home Address option that indicates the same virtual IP address that the second IP packet indicated as a destination IP address. Continuing the above example, the IP packet that server node 104A sends toward client node 108A may contain an IPv6 Mobility Header that specifies, using the Home Address option, the virtual IP address that is associated with server cluster 110A.

In one embodiment, the Binding Update option in the Mobility Header also indicates, in a Lifetime field, a value that is greater than zero. The presence of this value causes a cache entry to be established at the node for which the Mobility Header is destined, as is described below.

When the client node receives the IP packet that the server node sent, the Home Address option in the Binding Update option causes the client node to replace the IP packet's source IP address (i.e., the server node's IP address) with the IP address specified in the Home Address option (i.e., the virtual IP address). As a result of this replacement, the IP packet appears to have originated from the virtual IP address rather than the server node's IP address. This replacement may be performed at the IP layer, for example, before the TCP SYN/ACK packet contained within the IP packet is passed "upward" to the TCP layer.

Because the IP packet appears to have originated from the virtual IP address, the client node reacts to the TCP SYN/ACK packet as though the TCP SYN/ACK packet came in response to the TCP SYN packet that the client node originally sent toward the virtual IP address; without the earlier IP address replacement, the TCP SYN/ACK packet would appear to have come from the server node's IP address, and, consequently, the client node would not be able to "match up" the TCP SYN packet—which the client node did not send toward the server node's IP address—with the TCP SYN/ACK packet.

The presence of a non-zero value in the Lifetime field of the Binding Update option causes the client node to establish a cache entry locally within an IP layer cache. The cache entry indicates a binding between the IP packet's pre-replacement source IP address (i.e., the server node's IP address) and the IP address specified in the Home Address option (i.e., the virtual IP address). The cache entry remains in the IP layer cache for a period of time commensurate with the value indicated in the Lifetime field.

The presence of the cache entry within the client node's IP layer cache causes the client node to perform, at the IP layer, a destination IP address replacement operation on each outgoing IP packet that indicates the virtual IP address as a destination IP address. Because the cache entry binds the virtual IP address to the server node's IP address, the client node changes the destination IP addresses of such outgoing IP packets from the virtual IP address to the server node's IP address. As a result, IP packets that the client node otherwise would have sent toward the virtual IP address get routed toward the server node's IP address instead. Thus, such IP packets do not need to pass through the load-balancing node on their way to the server node. This helps to reduce the extent to which the load-balancing node becomes a "bottleneck."

The presence of the cache entry within the client node's IP layer cache also causes the client node to insert an IPv6 type 2 routing header, such as is described in the IETF RFC 3775, into each outgoing IP packet that indicates, pre-replacement, the virtual IP address as a destination IP address. The IPv6 type 2 routing header indicates the virtual IP address in the Home Address field. The client node sends such IPv6 packets, with IPv6 type 2 routing headers, toward the server node.

One such packet typically contains a TCP ACK packet that concludes the client-server handshake phase upon receipt; at the conclusion of the handshake phase, a TCP connection is established between the client node and the server node.

In block 306, an IPv6 packet, which indicates the client node's IP address as a source IP address, is received. The IPv6 packet contains an IPv6 type 2 header that indicates the virtual IP address, as described above. For example, server node 104A may receive such an IPv6 packet that client node 108A sent toward server node 104A.

The receipt of the IPv6 type 2 header causes the server node to continue to place an IPv6 Mobility Header, as described above with reference to block 304, into each IP packet that the server node sends toward the client node. The presence of the IPv6 Mobility Header in such IP packets causes the client node to continue to perform IP address replacement operations, so that the client node and the server node can communicate without the intervention of the load-balancing node.

Content-Based Load Balancing

The technique described above with reference to FIG. 2 is especially useful when all of the server nodes within a particular server cluster provide the same services. However, in some systems, the server nodes within a particular server cluster might offer different services. For example, one server node might offer HTTP services, while another server node might offer File Transfer Protocol (FTP) services, while yet another server node might offer Simple Mail Transfer Protocol (SMTP) services.

In such a scenario, some benefit may be derived from having the load-balancing node select a server node based on the contents of a message that is collectively contained within payload portions of the IP packets that the load-balancing node intercepts. For example, a load-balancing node might make a load-balancing decision based on a Uniform Resource Locator (URL) or a cookie that is embedded within a message. Because a single message might be split among multiple separate IP packets, the load-balancing node might need to accumulate and assemble the contents of multiple IP packets prior to inspecting the message and selecting the server node to which those IP packets are to be forwarded.

In order to accumulate packets, the load-balancing node typically needs to assume the burden of guaranteeing, to client nodes, that the data that the client nodes have sent has successfully reached the load-balancing node. Usually, this means that the load-balancing node needs to establish, at least initially, TCP connections with the client nodes. Through such TCP connections, the load-balancing node sends TCP ACK packets to the client nodes as an assurance that client-sent data has been received and does not need to be re-sent. The load-balancing node also typically assumes, at least temporarily, the responsibility for receiving TCP ACK packets from the selected server node, and re-sending data packets to the selected server node when necessary.

However, once the accumulated IP packets have been successfully transmitted between the load-balancing node and the selected server node, there is no real need for client-server communications to continue to pass through the load-balancing node.

Figure 4:
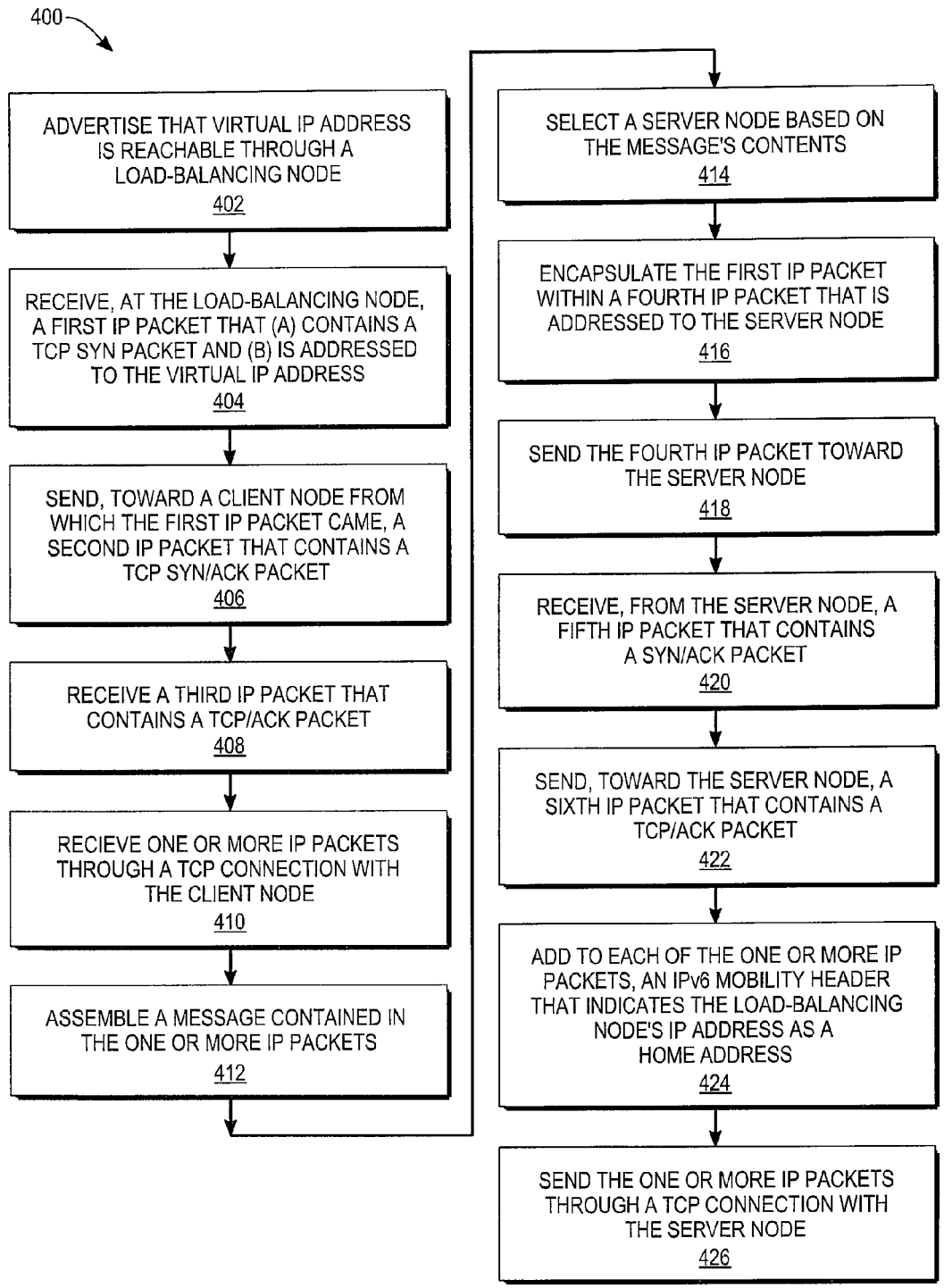
FIG. 4 is a flowchart that illustrates a technique by which a load-balancing node enables a client node and a server node to communicate without further intervention from the load-balancing node after the load-balancing node has selected the server node based on the collective contents of accumulated packets, according to one embodiment of the invention.

FIG. 4 is a flowchart that illustrates a technique by which a load-balancing node enables a client node and a server node to communicate without further intervention from the load-balancing node after the load-balancing node has selected the server node based on the collective contents of accumulated packets, according to one embodiment of the invention. In order to better describe the technique, examples given below refer to entities shown within FIG. 1. For example, the technique may be performed by any of load-balancing nodes 102A-N.

Referring to FIG. 4, in block 402, a load-balancing node advertises, to one or more routing nodes, that a particular virtual IP address is reachable through the load-balancing node. For example, using a routing protocol, load-balancing node 102A may advertise, to one or more network routers within network 106, that a particular virtual IP address, which is associated with server cluster 110A, is reachable through load-balancing node 102A. As a result, the network routers may send, toward load-balancing node 102A, IP packets that indicate the particular virtual IP address as a destination IP address.

In block 404, a first IP packet is received at the load-balancing node. The first IP packet contains a TCP SYN packet. The first IP packet also indicates the particular virtual IP address as a destination IP address. For example, load-balancing node 102A may receive an IP packet that client node 108A addressed to the particular virtual IP address that is associated with server cluster 110A.

In block 406, a second IP packet is sent toward the source IP address that is indicated in the first IP packet. The second IP packet contains a TCP SYN/ACK packet that indicates the TCP parameters by which the load-balancing node has agreed to abide. For example, load-balancing node 102A may send such an IP packet toward client node 108A. Upon receiving the TCP SYN/ACK packet, client node 108A may send a TCP ACK packet toward load-balancing node 102A.

In block 408, a third IP packet is received. The third IP packet contains a TCP ACK packet. For example, load-balancing node 102A may receive such an IP packet that client node 108A sent toward load-balancing node 102A in response to receiving the TCP SYN/ACK packet. Thus, the handshake phase between load-balancing node 102A and client node 108A is concluded, and a TCP connection between the two is established. Client node 108A may send one or more IP packets through the TCP connection.

In block 410, one or more IP packets are received through the TCP connection. For example, load-balancing node 102A may receive one or more IP packets that client node 108A sent through the TCP connection. The payload portions of the IP packets may collectively contain at least part of a message.

In block 412, at least part of a message collectively contained within the one or more IP packets is assembled. For example, load-balancing node 102A may accumulate the one or more IP packets and re-order and assemble their contents to construct at least a portion of a message.

In block 414, a server node is selected from among a plurality of server nodes based on the assembled message or portion thereof. For example, based on the contents of such a message (e.g., a URL, a cookie, etc.) or portion thereof, load-balancing node 102A may select server node 104A from among server nodes 104A-N. The selection also may be based on other criteria, some of which are described in greater detail below. Inasmuch as each server node is associated with its own distinct IP address, the selected server node is associated with an IP address that differs from the virtual IP address.

In block 416, the first IP packet is encapsulated within a fourth IP packet. While the first IP packet indicates the virtual IP address as a destination IP address, the fourth IP packet indicates the selected server node's IP address as a destination IP address. As a result, routing nodes that receive the fourth IP packet will forward the fourth IP packet toward the selected server. For example, load-balancing node 102A may encapsulate the first IP packet within a fourth IP packet, as described above, using IPv6 encapsulation mechanisms.

In one embodiment, the original TCP SYN packet from the client node is contained within the first IP packet. As a result, the TCP sequence and acknowledgement numbers that are represented in the TCP SYN packet are used in both the client-to-load balancer connection and the forthcoming load balancer-to-server connection.

In block 418, the fourth IP packet is sent toward the selected server node. For example, load-balancing node 102A may send the fourth IP packet through network 106 toward server node 104A. Server node 104A may receive the fourth IP packet, extract the TCP SYN packet encapsulated therein, and send, toward load-balancing node 102A, a TCP SYN/ACK packet that indicates TCP sequence and acknowledgement numbers that are based on those contained in the TCP SYN packet. The TCP SYN/ACK packet may be carried within an IP packet.

In block 420, a fifth IP packet, which was sent from the selected server node, is received. The fifth IP packet contains a TCP SYN/ACK packet. For example, load-balancing node 102A may receive such an IP packet that server node 104A sent toward load-balancing node 102A.

In block 422, a sixth IP packet is sent toward the selected server node. The sixth IP packet contains a TCP ACK packet. For example, load-balancing node 102A may send such an IP packet toward server node 104A. The receipt of the TCP ACK packet by server node 104A concludes the handshake phase between load-balancing node 102A and server node 104A. As a result, a TCP connection is established between load-balancing node 102A and server node 104A.

In block 424, the one or more IP packets that were received through the client-to-load balancer TCP connection in block 410 are modified. An IPv6 Mobility Header is added to each such packet. Each such Mobility Header contains a Binding Update option, and each such Binding Update option contains a Home Address option that indicates the load-balancing node's IP address. For example, to each such IP packet, load-balancing node 102A may add an IPv6 Mobility Header that indicates, in the Home Address option, an IP address that is associated with load-balancing node 102A. The load-balancing node's IP address typically differs from the virtual IP address.

Each such IP packet's source IP address is the IP address of the client node that originally sent the IP packet toward the virtual IP address. For example, the source IP address in each such IP packet may be the IP address that is associated with client node 108A.

In block 426, the modified IP packets are sent toward the selected server node through the TCP connection established between the load-balancing node and the selected server node. For example, load-balancing node 102A may send the modified IP packets toward server node 104A.

Once the selected server node receives the modified IP packets, which contain the IPv6 Mobility Headers, the selected server node may perform a technique that enables the client node and the selected server node to communicate without the intervention of the load-balancing node. Such a technique is described below with reference to FIG. 5.

Figure 5:
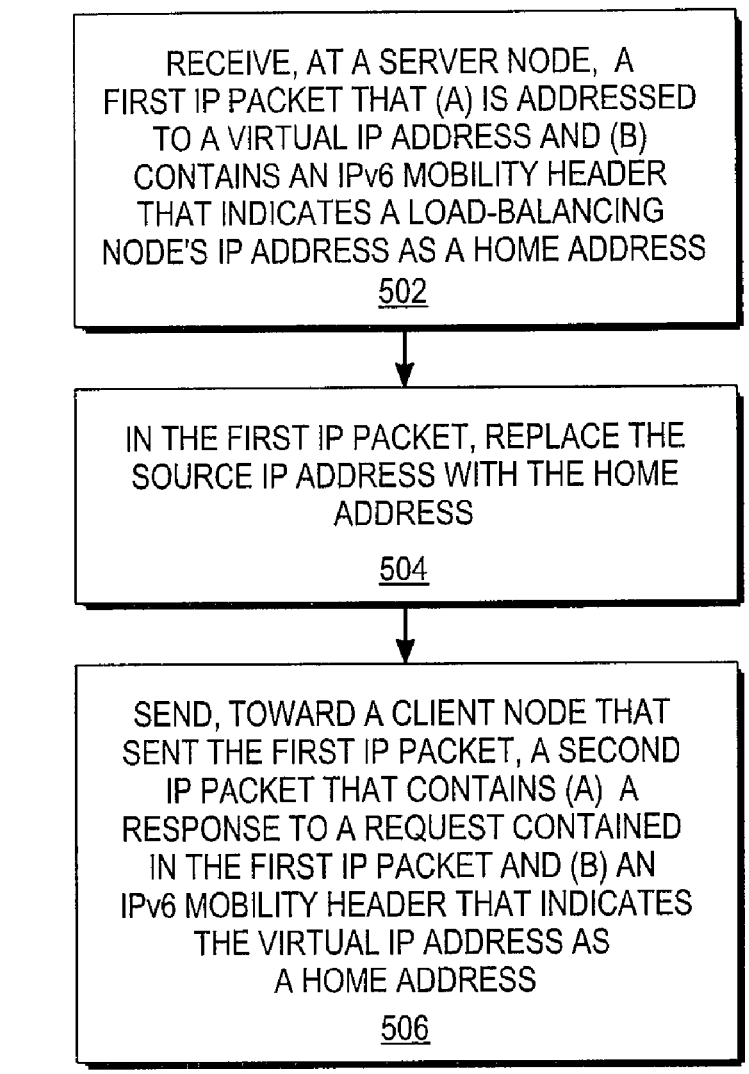
FIG. 5 is a flowchart that illustrates a technique by which a server node, which was selected by a load-balancing node based on the collective contents of accumulated packets, enables communication with a client node that sent the packets, without further intervention from the load-balancing node, according to one embodiment of the invention.

FIG. 5 is a flowchart that illustrates a technique by which a server node, which was selected by a load-balancing node based on the collective contents of accumulated packets, enables communication with a client node that sent the packets, without further intervention from the load-balancing node, according to one embodiment of the invention. In order to better describe the technique, examples given below refer to entities shown within FIG. 1. For example, the technique may be performed by any of server nodes 104A-N or 105A-N.

Referring to FIG. 5, in block 502, a first IP packet is received at a server node. The first IP packet indicates, as a destination IP address, a virtual IP address that is associated with a server cluster to which the server node belongs. The first IP packet indicates the IP address of a client node as a source address. For example, server node 104A may receive a modified IP packet that load-balancing node 102A sent toward server node 104A through a TCP connection. The modified IP packet may be, for example, one of the packets that are described above in relation to blocks 424 and 426 of FIG. 4. Continuing the example provided above with reference to FIG. 4, the modified IP packet's source IP address may be the IP address that is associated with client 108A, and the modified IP packet's destination IP address may be the IP address that is associated with the virtual IP address that is associated with server cluster 110A.

The first IP packet also contains an IPv6 Mobility Header, such as is described above with reference to block 424 of FIG. 4. The Mobility Header contains a Binding Update option. The Binding Update option specifies a Home Address option that indicates the IP address that is associated with a load-balancing node that sent the first IP packet toward the server node. Continuing the above example, the first IP packet may contain an IPv6 Mobility Header that specifies, using the Home Address option, the IP address that is associated with load-balancing node 102A.

The first IP packet also contains at least a portion of a request. For example, the first IP packet may contain an HTTP request, or a portion thereof.

In block 504, the source IP address in the first IP packet (i.e., the client node's IP address) is replaced with the IP address that is specified in the Home Address option of the IPv6 Mobility Header in the first IP packet (i.e., the load-balancing node's IP address). For example, server node 104A may perform this replacement in response to the presence of the Home Address option in the IPv6 Mobility Header of the first IP packet.

In block 506, a second IP packet is sent toward the client node that is associated with the pre-replacement source IP address indicated in the first IP packet. The second IP packet contains at least a portion of a response to the request that was at least partially contained in the first IP packet. For example, server node 104A may send, toward client node 108A, an IP packet that contains at least a portion of an HTTP response to the HTTP request that client node 108A previously sent toward the virtual IP address.

The second IP packet also contains an IPv6 Mobility Header. The Mobility Header contains a Binding Update option. The Binding Update option specifies a Home Address option that indicates the same virtual IP address that the first IP packet indicated as a destination IP address. Continuing the above example, the IP packet that server node 104A sends toward client node 108A may contain an IPv6 Mobility Header that specifies, using the Home Address option, the virtual IP address that is associated with server cluster 110A.

In one embodiment, the Binding Update option in the Mobility Header also indicates, in a Lifetime field, a value that is greater than zero. The presence of this value causes a cache entry to be established at the node for which the Mobility Header is destined, as is described below.

When the client node receives the IP packet that the server node sent, the Home Address option in the Binding Update option causes the client node to replace the IP packet's source IP address (i.e., the server node's IP address) with the IP address specified in the Home Address option (i.e., the virtual IP address). As a result of this replacement, the IP packet appears to have originated from the virtual IP address rather than the server node's IP address.

Because the IP packet appears to have originated from the virtual IP address, the client node reacts to the IP packet as though the IP packet came in response to the IP packets that the client node originally sent toward the virtual IP address.

The presence of a non-zero value in the Lifetime field of the Binding Update option causes the client node to establish a cache entry locally within an IP layer cache. The cache entry indicates a binding between the IP packet's pre-replacement source IP address (i.e., the server node's IP address) and the IP address specified in the Home Address option (i.e., the virtual IP address). The cache entry remains in the IP layer cache for a period of time commensurate with the value indicated in the Lifetime field.

The presence of the cache entry within the client node's IP layer cache causes the client node to perform, at the IP layer, a destination IP address replacement operation on each outgoing IP packet that indicates the virtual IP address as a destination IP address. Because the cache entry binds the virtual IP address to the server node's IP address, the client node changes the destination IP addresses of such outgoing IP packets from the virtual IP address to the server node's IP address. As a result, IP packets that the client node otherwise would have sent toward the virtual IP address get routed toward the server node's IP address instead. Thus, such IP packets do not need to pass through the load-balancing node on their way to the server node. This helps to reduce the extent to which the load-balancing node becomes a "bottleneck."

Thenceforth, the client node and the server node can communicate with each other as mobile devices using the mobility features of IPv6. The client node uses the load-balancing node's IP address as its "home address," and the server node uses the virtual IP address as its "home address."

TCP SYN/ACK Races

In one embodiment, instead of sending an intercepted TCP SYN packet toward a single server node in the manner described above with reference to FIG. 2, a load-balancing node sends intercepted TCP SYN packets to multiple server nodes within a server cluster. The load-balancing node may send a copy of an intercepted TCP SYN packet to each server node that is qualified to respond to a client request; in one embodiment, only those server nodes that satisfy specified criteria, some of which are described below, are selected to receive a copy of the TCP SYN packet.

In one embodiment, each of the selected server nodes receives a copy of the TCP SYN packet and responds to the client node with a TCP SYN/ACK packet, in the same manner as is described above with reference to FIG. 3. The TCP SYN/ACK packet that the client node receives first is deemed to be from the server node that is closest to, or has the fastest communications with, the client node. The client node sends an ACK packet only to the server node from which the first-received TCP SYN packet was received. As a result, a TCP connection is established between that server node and the client node.

The client node disregards the TCP SYN/ACK packets that the other server nodes sent. Upon detecting that a specified amount of time has passed without receiving a corresponding TCP ACK packet from the client node, these other server nodes abandon the attempt to connect to the client node.

For example, referring to FIG. 1 for sake of illustration, load-balancing node 102A may intercept a TCP SYN packet that client node 108A sent toward the virtual IP address that is associated with server cluster 110A. Based on specified criteria, load-balancing node 102A may determine that, among server nodes 104A-N, only server nodes 104A and 104B are qualified to provide the service that client node 108A requires. Consequently, load-balancing node 102A may send a copy of the TCP SYN packet to both server node 104A and server node 104B, in the manner described above with reference to FIG. 2.

Each of server nodes 104A and 104B receive a copy of the TCP SYN packet and send a corresponding TCP SYN/ACK packet toward client node 108A in the manner described above with reference to FIG. 3. If the connection path between server node 104A and client node 108A has less latency than the connection path between server node 104B and client node 108A, then the TCP SYN/ACK packet from server node 104A will reach client node 108A first. When client node 108A receives the TCP SYN/ACK packet from server node 104A, client node 108A sends a corresponding TCP ACK packet toward server node 104A. Thus, a TCP connection is established between client node 108A and server node 104A; these nodes may communicate with each other through this TCP connection.

Later, when client node 108A receives the TCP SYN/ACK packet that server node 104B sent, client node 108A disregards the TCP SYN/ACK packet and does not send a corresponding TCP ACK packet toward server node 104B. After waiting for a specified amount of time, server node 104B determines that a TCP connection with client node 108A will not be established, and abandons the attempt.

As a result of the foregoing technique, the best pairings of client and server nodes is achieved, so that communications between client and server nodes have as little latency as possible. Even if the network topology changes, the above technique still functions to select the best pairings in a real-time manner. The latency measurement achieved by using the above "SYN/ACK race" technique is more accurate and adaptable than other latency-measuring mechanisms.

Network Map

As is described above, the SYN/ACK race technique can be used to determine the relative latency "distances" between client and server nodes. This distance information can be used to generate a network map. The network map, in turn, can be used to make load-balancing decisions. For example, based on such a network map, load-balancing node 102 may select, from among server nodes 104A-N, a server node that has the least latency relative to client node 108A.

For example, a network map can be generated by turning on the SYN/ACK race for a predetermined amount of time. As the SYN/ACK race proceeds, the servers log the results of the race, e.g., the server records the clients that it establishes a connection with.

A load-balancer or centralized server can collect logs from the servers in the server clusters. A client IP address is listed in a log entry when a server establishes a connection with the client. Note that the server that establishes a connection with a client can be considered as the closest server to the client since the server won the SYN/ACK race. Given the log entry information, the load-balancer or centralized server can correlate the server and client information to create a map of major clients and their corresponding servers that are considered the closest to the clients.

The size of the generated network map can become large because the number of clients may grow to be unwieldy. One method of reducing the size of the network map is to use the subnet addresses of the clients instead of using each client's IP addresses. This brings the network map to a higher level of abstraction where the servers closest to the subnets are recorded.

The network map can be used by the load-balancers to make server selection decisions. The network map can be periodically refreshed by obtaining logs from the servers after the SYN/ACK race has been running for a predetermined time.

Persistent Session Management

As is described above, in one embodiment, the Binding Update option in the Mobility Header indicates, in a Lifetime field, a value that is greater than zero. The presence of this value causes a cache entry to be established at the node for which the Mobility Header is destined, as is described below.

As long as the cache entry remains in a client node's cache, the client node will continue to send IP packets to the same selected server node. This allows a session between the client node and the selected server node to persist. Because the client node communicates with the selected server node without intervention from the load-balancing node after the load-balancing node has selected the server node, there is no need to store session mapping information at the load-balancing node.

The cache entry expires after a period of time that is commensurate with the value of the Lifetime field. At this point, the cache entry is expelled from the cache, and the client node once again sends IP packets toward the virtual IP address; such packets get routed toward the load-balancing node again.

One advantage of this technique is that it is effective even when multiple client nodes are separated from the rest of a network environment by a proxy device. Another advantage of this technique is that it can be used even with non-HTTP client nodes and with HTTP client nodes that do not have cookies enabled.

Server Failover

At times, a server node may fail in some way and become at least temporarily incapable of servicing client requests. If a cache entry in a client node's cache binds the virtual IP address to the failed server node's IP address, then the client node will continue to send IP packets toward the failed server node's IP address. This is an undesirable result.

In order to compensate for the possibility of server node failure, in one embodiment, a load-balancing node periodically determines whether the server nodes in a server cluster remain capable of servicing client requests. For example, load-balancing node 102 can periodically "ping" server nodes 104A-N (such as the method described in U.S. patent application Ser. No. 09/909,711, owned by the Applicant, the entire contents of which is hereby incorporated by reference as if fully set forth herein); if a server node does not respond to the "ping" in a timely manner, then load-balancing node 102 may conclude that the server node has suffered some kind of failure.

In response to determining that a server node has failed, the load-balancing node can "assume" the failed server node's IP address by advertising, to one or more routing nodes, that the failed server node's IP address is associated with, or is reachable through, the load-balancing node. This causes the routing nodes to route, toward the load-balancing node, IP packets that are addressed to the failed server node. The load-balancing node therefore intercepts such IP packets.

When the load-balancing node intercepts such an IP packet, the load-balancing node determines whether the IP packet is addressed to the failed server node. If the IP packet is addressed to the failed server node, then the load-balancing node sends, toward the client node whose IP address is indicated as a source IP address in the IP packet, another IP packet that contains a TCP RST packet and an IPv6 Mobility Header.

The TCP RST packet instructs the client node to reset the TCP connection that the client node had established with the failed server node. The Mobility Header contains a Binding Update option that indicates, in the Lifetime field, a value of zero. The presence of the zero value in the Lifetime field causes the client node to remove, from the client node's cache, the cache entry that binds the virtual IP address to the failed server node's IP address. With the TCP connection reset and the cache entry removed, the client node will, once again, send IP packets toward the virtual IP address; the load-balancing node intercepts such packets.

The load-balancing node does not send intercepted packets to server nodes that are known to be in a non-operational state. Therefore, the load-balancing node selects a different server node, and sends the intercepted packets toward that server node. In one embodiment, the newly selected server node communicates with the client node using IPv6 mobility support features as described above. If and when a previously failed server node becomes operational again, then the load-balancing node may detect this (such as through the pinging technique) and once again include the recovered server node as a candidate when making a load-balancing decision.

Load Balancer Failover

In a traditional load-balancing cluster, a standby backup load-balancing node is provided for high availability in case a primary load-balancing node fails. The primary load-balancing node periodically transfers persistent session state information to the standby load-balancing node. If the primary load-balancing node fails, then the standby load-balancing node assumes the role of the primary load-balancing node, at least until the primary load-balancing node can be brought back online. Unfortunately, under this traditional approach, a "gap" of unavailability could occur during the switchover.

However, using the techniques described herein, client-server connections do not need to be interrupted, since client nodes and server nodes are able to communicate without the further intervention of the load-balancing node. Because the client node maintains a binding to the server node in the form of the cache entry discussed above, the client node continues to communicate with the same server node, without losing persistence, even when the load-balancing node that selected the server node fails.

Global Load Balancing

In the past, each server cluster would be assigned one or more dedicated load-balancing nodes. A particular load-balancing node would only select from among server nodes in the server cluster to which the particular load-balancing node belonged. The fact that the load-balancing node always acted as an intermediary throughout all communications between client nodes and server nodes made it necessary for the load-balancing node to be in close proximity, in the network, to the load-balancing node's corresponding server cluster. If the load-balancing node were located too remotely from the server nodes, then the latency would become unacceptably high.

Fortunately, using to the techniques discussed herein, this proximity limitation is removed. As is described above, once a load-balancing node has selected a server node, the load-balancing node does not need to have any more participation in the communications between that server node and a client node. As a result, the load-balancing node does not need to be located in close proximity, in the network, to any particular server node. Load-balancing nodes do not even need to be in the same LAN or WAN as the server nodes from which the load-balancing nodes choose. Using the techniques described herein, a load-balancing node may be placed close to one or more client nodes, or anywhere in the Internet, for that matter. Using the SYN/ACK race features described above, a qualified server node having the least latency related to a client node can be selected regardless of the position of the load-balancing node relative to the server node.

Anycast

According to one embodiment, a single server cluster serves requests that originate from anywhere in the world.

However, according to an alternative embodiment, there are multiple separate server clusters (e.g., server clusters 110A and 110B shown in FIG. 1). Each server cluster may be associated with a different geographical region or location. Furthermore, each server cluster may be associated with the same virtual IP address—a uniform, global, "anycast" address. Each load-balancing node, regardless of that load-balancing node's location, advertises to one or more routing nodes that the anycast address is reachable through that load-balancing node.

As a result of both this advertising and the routing algorithms that are employed by the routing nodes, the routing nodes route each client node's requests (which are addressed to the "anycast" address) to the load-balancing node that is nearest to, or has the lowest latency relative to, that client node. The IPv6 Binding Update options discussed above, which create bindings between client nodes and server nodes, eliminate the possibility that a routing node will route requests from a particular client node to more than one server cluster, so long as the binding remains valid.

Example Server Node Selection Technique

As is discussed above in relation to block 206 of FIG. 2, load-balancing node may select a server node from among a plurality of server nodes based on specified criteria. An example technique for selecting a server node is now described.

In one embodiment, a load-balancing device selects, from among a set of server nodes in a server cluster, a first subset of server nodes that are functional. For example, load-balancing node 102 may "ping" each of server nodes 104A-N (such as the method described in U.S. patent application Ser. No. 09/909,711, owned by the Applicant). Those of server nodes 104A-N that respond to the "ping" in a timely manner are included within the first subset.

From among the first subset, the load-balancing node selects a second subset of server nodes that are capable of providing a service that the client node is requesting. For example, load-balancing node 102 may inspect a destination TCP port that is indicated in an intercepted TCP SYN packet. Load-balancing node 102 may determine a particular service (e.g., HTTP, FTP, SMTP) that is associated with the destination TCP port. Load-balancing node 102 may maintain a mapping between services and the server nodes that provide those services. If the destination TCP port is port 80, for example, then load-balancing node 102 may select, from among the first subset, one or more server nodes that provide HTTP services.

From among the second subset, the load-balancing node selects a third subset of server nodes that possess the resource that the client node is requesting. For example, if an HTTP request is for a particular file or Web page, then load-balancing node 102 may determine which of the server nodes in the second subset possess the particular file or Web page; the file or page might be present on some server nodes but not on others.

If the request is associated with a particular session, and if the server node that is associated with the particular session is contained in the third subset, then the load-balancing node selects that server node. If that server node is not currently operational, then it will not be in the third subset, and the load-balancing node will attempt to select another server node.

If more than one server node is present in the third subset, then the load-balancing node may select from among them based on one or more factors. For example, load-balancing node 102 may select, from among multiple server nodes, the server node that has the least latency, or which is closest to, the client node that sent the request. For another example, load-balancing node 102 may select, from among multiple server nodes, the server node that is least loaded. Each server node's load may be determined based on that server node's processing capacity, memory capacity, secondary storage capacity, and/or the number of client nodes with which that server node is concurrently communicating. While the foregoing list is illustrative, it is not exhaustive. For another example, load-balancing node 102 may base its selection upon both the latency and load factors discussed above.

Implementing Mechanisms

Figure 6:
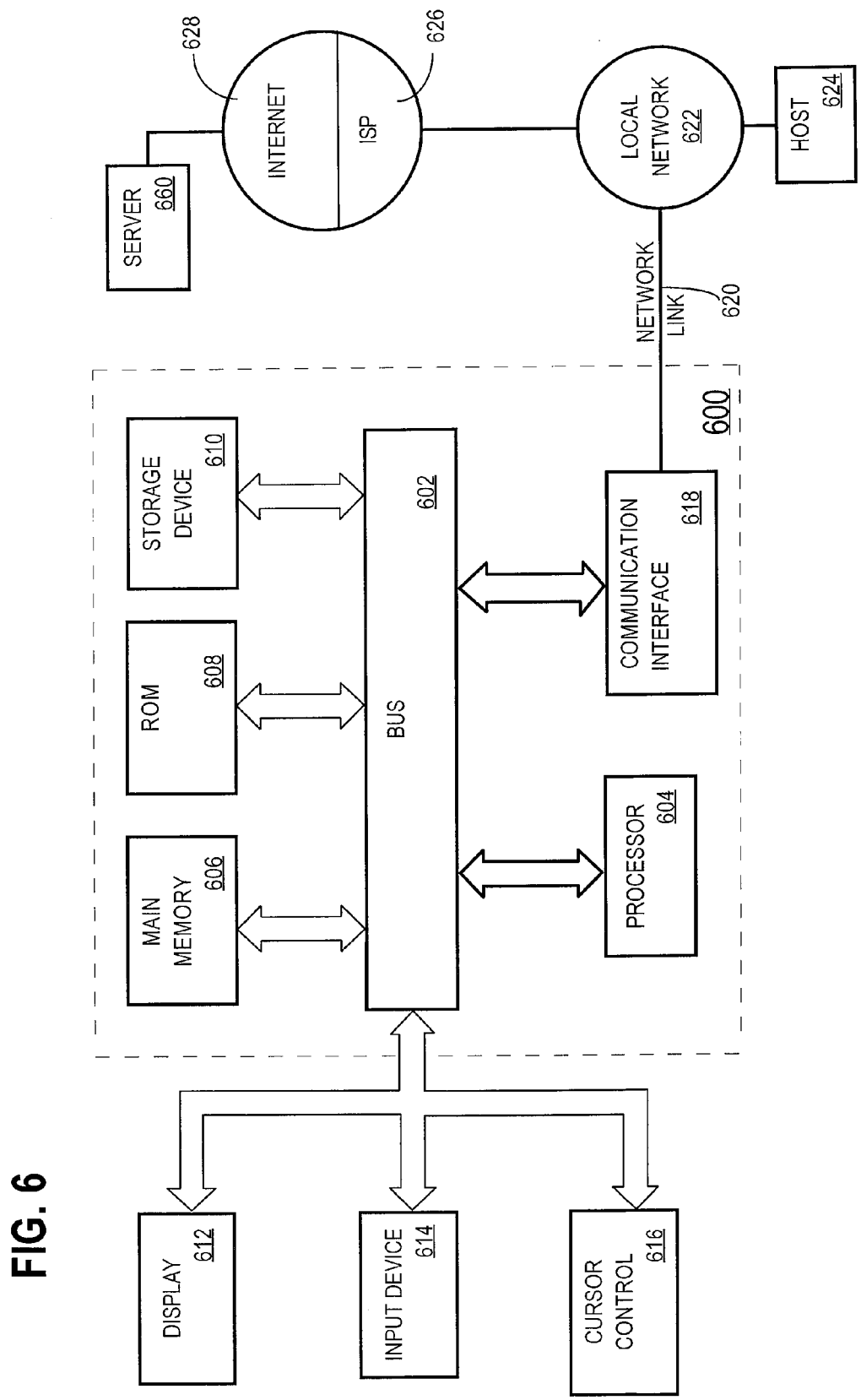
FIG. 6 is a block diagram that illustrates a computer system upon which an embodiment of the invention may be implemented.

According to certain embodiments of the invention, a load-balancing node and a server node each may be implemented on a computer system. FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 650 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for communicating amongst a plurality of computer network nodes, the method comprising:

receiving, at a load balancing node, an IP packet from a client node that specifies at least a portion of a request from the client node;

selecting one of a plurality of server nodes to respond to the request from the client node;

with the load-balancing node, adding an IPv6 Mobility Header to the IP packet, the IPv6 Mobility Header including a binding update option that specifies an IP address associated with the load balancing node as a home address, wherein an IP address associated the client node is a care-of address; and sending the IP packet with the IPv6 Mobility Header to the selected server node.

2. The method of claim 1, further comprising: sending, with the server node, a different IP packet to the client node, the different IP packet containing at least a portion of a response to the request that was at least partially specified in the IP packet.

3. The method of claim 2, wherein the different IP packet includes an IPv6 Mobility Header with a binding update option that specifies the IP address associated with the load balancing node as a home address.

4. The method of claim 2, wherein the different IP packet with the IPv6 Mobility Header specifies an IP address associated with the server node as a care-of address.

5. The method of claim 2, wherein the different IP packet with the IPv6 Mobility Header is configured to cause the server node to establish a cache entry within an IP layer cache that indicates a binding between the IP address associated with the server node and the IP address associated with the load balancing node.

6. The method of claim 1, wherein the IPv6 Mobility Header is configured to cause the server node to replace a source address in the IP packet with the home address, which is the IP address associated with the load balancing node.

7. The method of claim 1, wherein the load balancing node selects the selected server node based on the contents of the IP packet.

8. The method of claim 1, wherein the load balancing node receives a plurality of IP packets from the client node and selects the selected server node based on the contents of the plurality of IP packets.

9. The method of claim 1, wherein the IPv6 Mobility Header is configured to cause the server node to establish a cache entry within an IP layer cache that indicates a binding between the IP address associated with the client node and the IP address associated with the load balancing node.

10. The method of claim 1, wherein the source address of the IP packet represents a care-of address and specifies an IP address associated with the client node.

11. The method of claim 1, wherein the request is an HTTP request.

12. A system, comprising:

a client node, a load-balancing node, and a plurality of server nodes, each comprising computer apparatus with one or more processors and a memory holding instructions that, when executed by the one or more processors, cause said nodes to operate as follows:

the client node sending an IP packet to a load-balancing node, the IP packet specifying at least a portion of a request from the client node;

the load-balancing node receiving the IP packet and selecting one of a plurality of server nodes to respond to the IP packet;

the load-balancing node adding an IPv6 Mobility Header to the IP packet, the IPv6 Mobility Header including a binding update option that specifies an IP address associated with the load balancing node as a home address, wherein an IP address associated with the client node is a care-of address, the load balancing node sending the IP packet with the IPv6 Mobility Header to the selected server node.

13. The system of claim 12, wherein the server node sends a different IP packet to the client node, the different IP packet containing at least a portion of a response to the request that was at least partially specified in the IP packet.

14. The system of claim 13, wherein the different IP packet includes an IPv6 Mobility Header with a binding update option that specifies the IP address associated with the load balancing node as a home address.

15. The system of claim 13, wherein the different IP packet with the IPv6 Mobility Header specifies an IP address associated with the server node as a care-of address.

16. The system of claim 13, wherein, in response to the different IP packet with the IPv6 Mobility Header with the binding update option received at the client node, the client node establishes a cache entry within an IP layer cache that indicates a binding between the IP address associated with the server node and the IP address associated with the load balancing node.

17. The system of claim 12, wherein, in response to the IPv6 Mobility Header, the server node replaces a source address in the IP packet with the IP address associated with the load balancing node.

18. The system of claim 12, wherein the load balancing node selects the selected server node based on the contents of the IP packet.

19. The system of claim 12, wherein the load balancing node receives a plurality of IP packets from the client node and selects the selected server node based on the contents of the plurality of IP packets.

20. The system of claim 12, wherein, in response to the IPv6 Mobility Header with the binding update option received at the server node, the server node establishes a cache entry within an IP layer cache that indicates a binding between the IP address associated with the client node and the IP address associated with the load balancing node.

21. The system of claim 12, wherein the source address of the IP packet represents a care-of address and specifies an IP address associated with the client node.

22. The system of claim 12, wherein the request is an HTTP request.

* * * * *